No. 840,842. PATENTED JAN. 8, 1907.
C. R. GREUTER.
DRIVING AXLE SUSPENSION FOR MOTOR VEHICLES.
APPLICATION FILED DEC. 29, 1905. RENEWED NOV. 22, 1906.
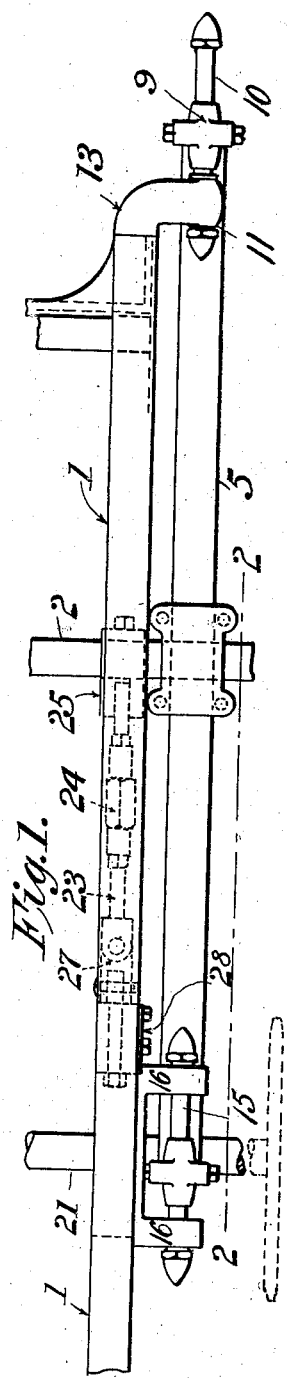
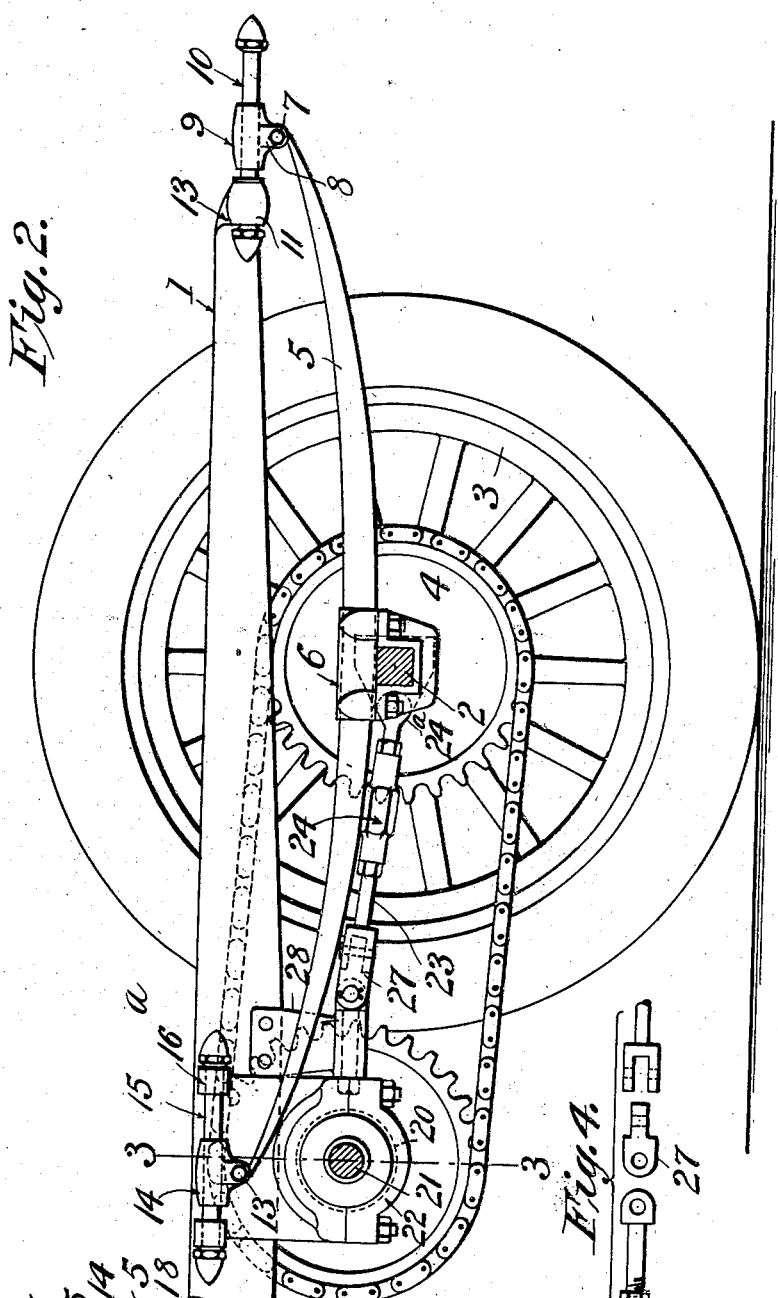
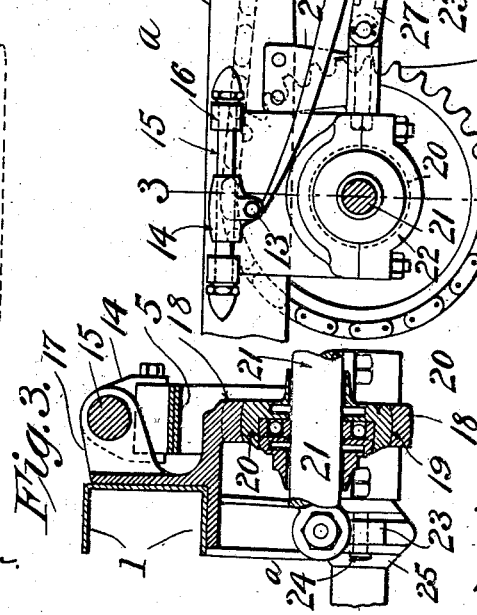
Witnesses:
H. L. Sprague
E. W. Seaholm
Inventor:
Charles R. Greuter
by Chapin & Co.
Attorneys

UNITED STATES PATENT OFFICE.

CHARLES R. GREUTER, OF HOLYOKE, MASSACHUSETTS, ASSIGNOR TO MATHESON MOTOR CAR COMPANY, OF WILKES-BARRE, PENNSYLVANIA, A CORPORATION.

DRIVING-AXLE SUSPENSION FOR MOTOR-VEHICLES.

No. 840,842.  Specification of Letters Patent.  Patented Jan. 8, 1907.

Application filed December 29, 1905. Renewed November 22, 1906. Serial No. 344,649.

*To all whom it may concern:*

Be it known that I, CHARLES R. GREUTER, a citizen of the United States of America, residing at Holyoke, in the county of Hampden and State of Massachusetts, have invented new and useful Improvements in Driving-Axle Suspension for Motor-Vehicles, of which the following is a specification.

This invention relates to the running-gear of motor-vehicles, and has special reference to the means for suspending the driving-axle.

To this end the invention contemplates a simple and thoroughly practical construction of hanging means for both the axle carrying the driving-wheels of the motor-vehicle and the counter-shaft now usually termed in the motor-vehicle art a "jack-shaft," said shaft being driven from the engine and carrying the usual driving-sprockets from which the chains extend to the driven sprockets on the rear axle. The improved hanging means include a novel type of bearing-hanger for the jack-shaft and provide means for maintaining this shaft in its proper parallel position with the crank-shaft of the engine, while at the same time permitting all the torsional movements of the running-gear frame to take place without imposing strain on the shaft. Also the novel suspension or hanging means for the rear axle and the jack-shaft include means for positively maintaining the predetermined distance between the jack-shaft and the rear axle, and at the same time permitting of the adjustment of this distance—that is, the adjustment of the rear axle toward and from the jack-shaft—whereby the wheel-base is increased or diminished, thus rendering it possible to shift the axle and give sufficient slack in the chain to permit the insertion or removal of the link thereof. While these various objects are attained, the relation of the jack-shaft to the engine is maintained constant or invariable.

With these and other objects in view, which will more readily appear as the nature of the invention is better understood, the same consists in the novel construction, combination, and arrangement of parts hereinafter more fully described, illustrated, and claimed.

The leading features of the invention involved in carrying out the objects above indicated are necessarily susceptible to structural change without departing from the scope of the invention, but a preferred embodiment thereof is shown in the accompanying drawings, in which—

Figure 1 is a plan view of one end portion of the running-gear frame of a motor-vehicle, showing the mounting and relation of the jact-shaft and rear axle and also a preferable position of the distance-rod, the sprocket and rear wheel being cut off. Fig. 2 is a side elevation of the parts shown in Fig. 1, the plane of section through the jack-shaft and axle being on the line 2 2 of Fig. 1. Fig. 3 is a vertical sectional view through the bearing-mounting on the line 3 3 of Fig. 2. Fig. 4 is a detail view of the gimbal-joint connection for the distance-rod with the parts separated.

Like references designate corresponding parts in the several figures of the drawings.

In carrying out the present invention the mechanical parts comprising the improved suspension or hanging means are associated with the running-gear frame at opposite sides thereof to secure the necessary balancing, as well understood by those familiar with structures of this character, so for the purposes of the application a description of the construction at one side of the frame will suffice.

For purposes of illustration there is shown in the drawings that portion of the running-gear frame 1 with which is associated the rear axle 2 and the rear driving-wheel 3 of a motor-vehicle. With these parts is also associated the driven sprocket-wheel 4, connected in the usual manner with the wheel 3 to provide for transmitting the power of the engine thereto for propelling the vehicle. To provide for the spring support of these elements, the present invention contemplates the employment of a main subporting-spring 5, preferably of the common semi-elliptic form, and rigidly fastened at a central point between its ends to the rear axle 2 through the medium of an axle clip or clamp 6, securely bolted to the rear axle, as is plainly shown in Fig. 2 of the drawings. The front and rear end portions of the semi-elliptic main supporting-spring 5 have a slidable and rotative connection with the running-gear frame 1. At the rear end of the main supporting-spring 5 this connection is provided for by pivotally bolting the rear end of the spring, as at 7, to the bolt-ear 8, pendent from the coupling-sleeve 9, slidably mounted upon the fixed guide-rod 10, arranged in parallel relation to the longitudinal plane of the frame 1 and bolted or otherwise rigidly secured, as at 11, in an eye provided at the outer end of a bracket-arm 13, turned out from the rear end of the frame 1 and constituting an end hanger for the rear guide-rod 10.

A similar construction is provided for the mounting of the front end of the main supporting-spring 5, which end of said spring is pivotally bolted at 13 to a coupling-sleeve 14, slidably mounted on a front guide-rod 15, arranged in the longitudinal plane of the rear rod 10 and held in offset parallel relation from the frame by being mounted at its ends in the oppositely-arranged arms 16 of a forked hanger-bracket 17, rigidly mounted upon one side of the running-gear frame 1 a suitable distance in front of the rear end of said frame.

A practical and preferable embodiment of the invention, as plainly shown in Fig. 3 of the drawings, resides in constructing the front hanger-bracket 17 of a casting which has formed therewith as an integral part thereof a pendent bearing-hanger 18, lying in the vertical plane of the front guide-rod 15 and provided therein with a bearing-opening 19. This bearing-opening may be described as having a spherical curvature matching the corresponding curvature of the periphery of a bearing 20, held within the said opening 19. To provide for the mounting and removal of the parts constituting the bearing-support for the jack-shaft 21, the bearing-hanger 18 is provided at its lower side with a removable cap-section 22, similar in construction and mounting to the detachable caps of sectional bearing-boxes.

The spherical bearing 20 may be of the ball-bearing of any improved type without affecting the essential feature of the improvement, which consists in the bearing 20 being so constructed and mounted as to always maintain the jack-shaft 21 in its proper parallel position with the crank-shaft of the engine, while at the same time permitting of the torsional movements of the running-gear frame to take place without placing any strain on the said shaft.

While the preferable construction for hanging the spherical bearing 20 has been described, it will be understood that the bearing-hanger 18 may be made separate from the casting of the hanger-bracket 17, and otherwise rigidly connected with the frame without affecting the invention.

The predetermined distance between the jack-shaft 21 and the rear axle 2 is maintained through the employment of a distance-rod 23, provided with an adjusting turnbuckle 24. This distance-rod 23 has a pivotal connection 24$^a$ at its rear end to a clip, collar, or other equivalent fitting 25, bolted or otherwise rigidly secured to the rear axle 2, and at its front end the said distance-rod 23 has a gimbal or universal joint connection 27 to a rigid arm or frame member 28 pendent from and rigid with the running-gear frame 1. Through the adjustment of the turnbuckle 24 the rear axle can be moved in a direction toward or from the jack-shaft. This results in increasing or diminishing the wheel-base and makes it possible to shift the rear axle to give sufficient slack in the chain to permit of the insertion or removal of a link thereof. At the same time when the adjustment of the distance-rod has once been made such rod serves to maintain the proper distance between the jack-shaft and the rear axle, and under all conditions the relation of the jack-shaft of the engine in invariable.

Inasmuch as the proper distance between the said jack-shaft and the rear axle is maintained by the distance-rod, it follows that the compression of the main spring 5 will result in a sliding movement of the sleeves 9 and 14 on the fixed guide-rods therefor. Furthermore, inasmuch as the said sleeves have a rotative movement on their shafts, the axle can always accommodate itself to the movement of either side of the frame in a vertical plane.

Various modifications of the invention may be resorted to—such, for instance, as locating the distance-rod below the spring, thereby bringing the same nearer to the sprocket—and other structural changes can be resorted to without departing from the spirit of the invention or sacrificing any of the advantages thereof.

Having thus described the invention, what is claimed and desired to be secured by Letters Patent is—

1. In a driving-axle suspension for motor-vehicles, the combination with the running-gear frame and the rear axle, of a main supporting-spring fastened to the axle and having slidable and rotative connections between its ends and the frame.

2. In a driving-axle suspension for motor-vehicles, the combination with the frame, the rear axle and jack-shaft, of the main supporting-spring having slidable and rotative connections between its ends and the frame, a support for the jack-shaft, and adjustable means for maintaining the distance between the rear axle and the jack-shaft.

3. In a driving-axle suspension for motor-vehicles, the combination with the frame, the wheel-axle, and the jack-shaft, a main supporting-spring having slidable connections between its ends and the frame, a support for the jack-shaft carried by the frame, and the distance-rod connection between the axle and the frame, said distance-rod connection embodying a universal joint.

4. In a driving-axle suspension for motor-vehicles, the combination with the frame, the wheel-axle, and the jack-shaft, of a supporting-spring having slidable and rotative connections between its ends and the frame, a bearing-hanger carried by the frame, a rocking bearing mounted in said hanger and receiving the jack-shaft, and an adjustable distance-rod having a pivotal connection at one end with the axle and a gimbal-joint connection at its other end with the frame.

5. In a driving-axle suspension for motor-vehicles, a frame carrying opposite longitudinally-arranged fixed guide-rods, a main supporting-spring fastened to the wheel-axle and carrying at its ends coupling-sleeves slidably and rotatably engaging the opposite guide-rods, a bearing-hanger rigid with the frame and provided with a bearing-opening, a spherical bearing mounted in said opening and receiving the jack-shaft, a rigid frame member carried by the frame, and an adjustable distance-rod having a gimbal connection joint at one end with said member and at its other end pivotally coupled to the wheel-axle.

CHARLES R. GREUTER.

Witnesses:
 WM. H. CHAPIN,
 K. I. CLEMONS.